US012621217B2

(12) United States Patent
Solanki et al.

(10) Patent No.: US 12,621,217 B2
(45) Date of Patent: May 5, 2026

(54) EMBEDDED RESOURCE LAYOUT

(71) Applicant: Rakuten Mobile, Inc., Tokyo (JP)

(72) Inventors: Kuldeep Solanki, Madhya Pradesh (IN); Pankaj Mukati, Madhya Pradesh (IN); Satyam Shrivastav, Madhya Pradesh (IN); Ankush Tiwari, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 528 days.

(21) Appl. No.: 17/759,042

(22) PCT Filed: May 31, 2022

(86) PCT No.: PCT/US2022/031521
§ 371 (c)(1),
(2) Date: Jul. 19, 2022

(87) PCT Pub. No.: WO2023/234917
PCT Pub. Date: Dec. 7, 2023

(65) Prior Publication Data
US 2024/0223468 A1 Jul. 4, 2024

(51) Int. Cl.
*H04L 41/22* (2022.01)
*G06F 9/451* (2018.01)

(52) U.S. Cl.
CPC .............. *H04L 41/22* (2013.01); *G06F 9/451* (2018.02)

(58) Field of Classification Search
CPC ................................. H04L 41/22; G06F 9/451
See application file for complete search history.

(56) References Cited

U.S. PATENT DOCUMENTS

| | | | |
|---|---|---|---|
| 2007/0282869 A1* | 12/2007 | Paulus ................. | G06F 16/972 |
| 2010/0138268 A1* | 6/2010 | Guo ..................... | G06Q 10/063 |
| | | | 705/7.11 |
| 2013/0212487 A1* | 8/2013 | Cote ...................... | G06F 9/451 |
| | | | 715/745 |
| 2017/0083222 A1 | 3/2017 | Boodhoo et al. | |
| 2018/0032627 A1* | 2/2018 | Margatan ............... | H04L 67/02 |
| 2019/0065445 A1* | 2/2019 | Jiang ................... | G06F 16/958 |
| 2019/0068703 A1* | 2/2019 | Vora ........................ | H04L 67/34 |
| 2020/0184394 A1 | 6/2020 | Delacourt et al. | |
| 2020/0201610 A1* | 6/2020 | Wei ........................... | G06F 8/38 |
| 2021/0342128 A1* | 11/2021 | Carraway .............. | G06F 9/451 |

* cited by examiner

*Primary Examiner* — Mahelet Shiberou
(74) *Attorney, Agent, or Firm* — HAUPTMAN HAM, LLP

(57) ABSTRACT

Embedded resource layouts are presented by rendering an interface document to cause a graphical interface to be displayed in accordance with appearance specifications for the graphical interface in the interface document, embedding, into the interface document in response to rendering the interface document, a resource layout document corresponding to a reference in the interface document and a user identity, retrieving, through a network in response to embedding the resource layout document, a plurality of resource values, each resource value among the plurality of resource values corresponding to a resource reference in the resource layout document, and arranging the plurality of resource values in the graphical interface in accordance with positioning specifications in the resource layout document.

20 Claims, 9 Drawing Sheets

EMBEDDED RESOURCE LAYOUT

RELATED APPLICATIONS

The present application is a National Phase of International Application No. PCT/US2022/031521 filed May 31, 2022.

BACKGROUND

Technical Field

This description relates to embedded resource layouts.

Background

User controls over electro-mechanical systems, such as telecommunications networks, are becoming digitized, and accessible over communication networks. Any given user may have control over various control parameters distributed among different unit within a system, and may utilize information from other units within the system. Control parameters and other information of the system are presented through a graphical interface for the user to view and modify.

SUMMARY

According to at least some embodiments of the present invention, embedded resource layouts are presented by rendering an interface document to cause a graphical interface to be displayed in accordance with appearance specifications for the graphical interface in the interface document, embedding, into the interface document in response to rendering the interface document, a resource layout document corresponding to a reference in the interface document and a user identity, retrieving, through a network in response to embedding the resource layout document, a plurality of resource values, each resource value among the plurality of resource values corresponding to a resource reference in the resource layout document, and arranging the plurality of resource values in the graphical interface in accordance with positioning specifications in the resource layout document.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
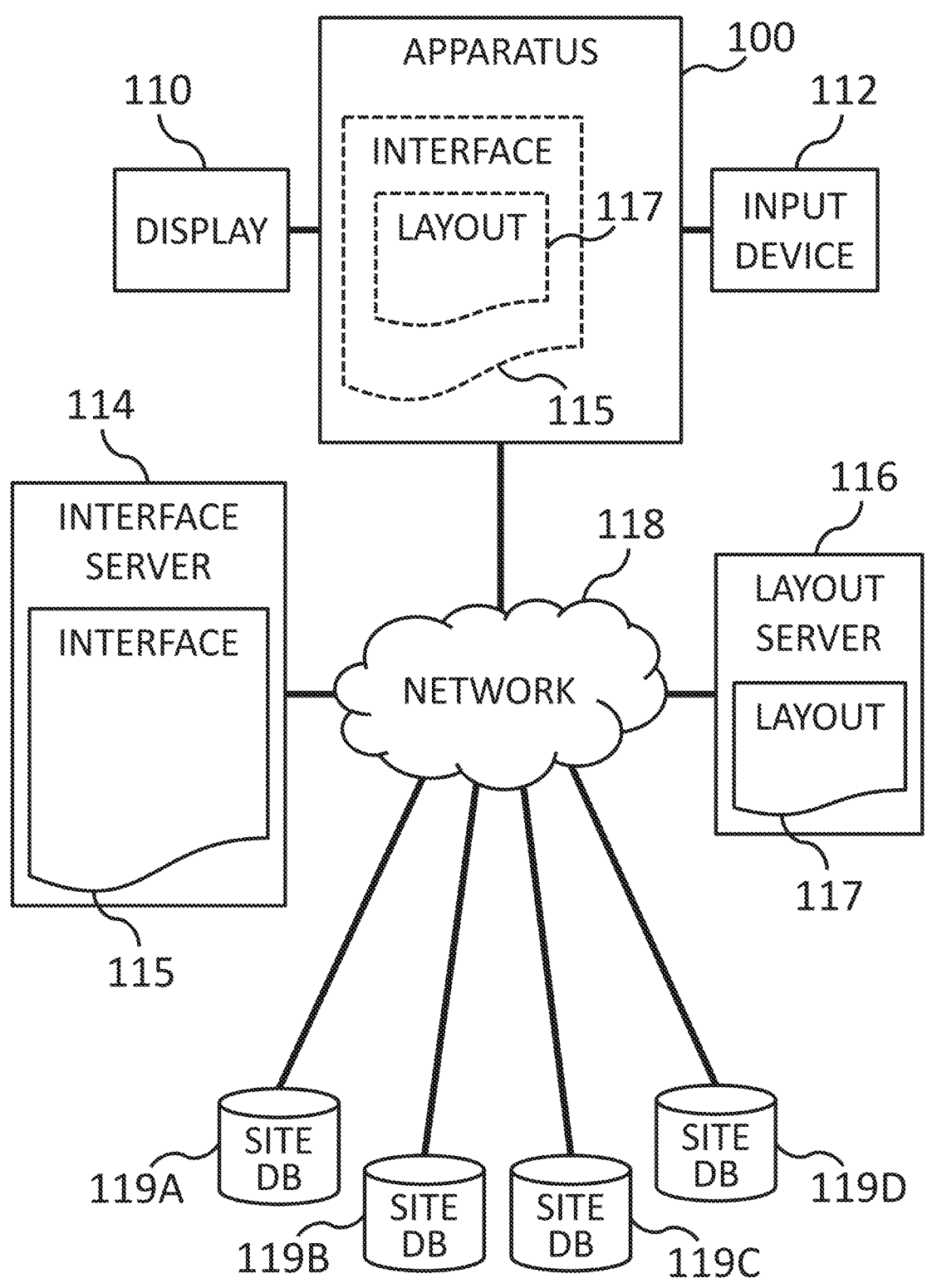
FIG. 1 is a block diagram of a system for embedded resource layout, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

The view in graphical interfaces of systems is common for all users, meaning the parameters presented and layout thereof is the same regardless of the parameters actually controlled by the user. Some systems have a few different layouts, based on the roles of users. In such systems, if any parameter needs to be removed, added, or relocated, development efforts are required each time, for each user.

At least some embodiments herein include a fully automated system while keeping flexibility in the user's hand to add and remove attributes from a page layout. In at least some embodiments, users create a page layout site-type-wise by editing a default layout. In at least some embodiments, users view available site resources by clicking settings. In at least some embodiments, users select new resources from existing site resources, such as from view builder service database, and add it to the page layout, and then save the page layout.

In at least some embodiments, an apparatus enables user to perform a method for embedded resource layout, including editing an existing default layout to create a page layout for a site-type or edit the existing site-type layout, opening a menu for existing site resources, dragging any new resources into the page layout, removing any resources from the page layout, and saving the page layout for the site-type.

In at least some embodiments, the resource layout information is in a resource layout document that is separate from an interface document. In at least some embodiments, the resource layout document includes only the information that varies from user to user, and the interface document includes information that is the same for each user, which conserves storage space. In at least some embodiments, the interface document includes API calls for each resource reference that requests the minimum information necessary to present and edit the resource value, which conserves bandwidth and processing power.

FIG. 1 is a block diagram of a system for embedded resource layout, according to at least some embodiments of the present invention. The system includes an apparatus 100, a display 110, an input device 112, an interface server 114, a layout server 116, a network 118, and a plurality of site databases 119A, 119B, 119C, and 119D.

Apparatus 100 receives input signals from input device 112 and transmits output signals to display 110. In at least some embodiments, apparatus 100 is configured for embedded resource layout. In at least some embodiments, apparatus 100 receives an interface document 115 and a resource layout document 117, and embeds resource layout document 117 into interface document 115. In at least some embodiments, output signals are transmitted to display 110 to present a graphical interface in accordance with interface document 115 and resource layout document 117. In at least some embodiments, apparatus 100 includes the structure of apparatus 900 described hereinafter with respect to FIG. 9.

Interface server 114 is in communication with apparatus 100 through network 118. In at least some embodiments, interface server 114 is configured to store interface documents, such as interface document 115. In at least some embodiments, interface document 115 includes an instruction to request the resource layout. In at least some embodiments, interface document 115 includes appearance specifications for the graphical interface. In at least some embodiments, interface document 115 is an HTML (Hyper-Text Markup Language) document. In at least some embodiments, interface document 115 includes, for each resource reference among the plurality of resource references, a string representing an API call for retrieving the corresponding resource value. In at least some embodiments, the instruction includes a network address of a resource layout document, such as resource layout document 117. In at least some embodiments, interface server 114 is configured to respond to requests for interface documents by transmitting interface documents to requesting apparatuses through network 118. In at least some embodiments, interface server 114 is an HTTP (Hyper-Text Transfer Protocol) server. In at least some embodiments, interface server 114 is a stand-alone server or a virtual server instance provided on one or more servers of a cloud computing network.

Layout server 116 is in communication with apparatus 100 through network 118. In at least some embodiments, layout server 116 is configured to store resource layout documents, such as resource layout document 117. In at least some embodiments, resource layout document 117 includes a plurality of resource references, each resource reference including an instruction to retrieve the associated resource value from a site database among the plurality of site databases 119A, 119B, 119C, and 119D. In at least some embodiments, the resource layout document 117 is a JSON (JavaScript Object Notation) document or an XML (extensible Markup Language) document. In at least some embodiments, layout server 116 is configured to respond to requests for resource layout documents by transmitting resource layout documents to requesting apparatuses through network 118. In at least some embodiments, layout server 116 is configured to respond to requests to update resource layout documents by receiving resource layout documents from apparatuses through network 118. In at least some embodiments, layout server 116 is an API (Application Programming Interface) server. In at least some embodiments, layout server 116 is a stand-alone server or a virtual server instance provided on one or more servers of a cloud computing network.

Network 118 is configured to facilitate communication among electronics, such as apparatus 100, interface server 114, layout server 116, and site databases 119A, 119B, 119C, and 119D. In at least some embodiments, network 118 is a telecommunications network including radio access points and backend servers. In at least some embodiments, network 118 is a wide area network, such as the Internet, that connects many different sub networks. In at least some embodiments, network 118 supports one or more communication standards so that many different types of electronics are able to connect.

Site databases 119A, 119B, 119C, and 119D are each in communication with apparatus 100 through network 118. In at least some embodiments, site databases 119A, 119B, 119C, and 119D are each configured to store resource values for a corresponding resource. In at least some embodiments, site databases 119A, 119B, 119C, and 119D are each configured to store associated information, such as one or more resource value constraints associated with each stored resource value. In at least some embodiments, site databases 119A, 119B, 119C, and 119D are configured to respond to requests for resource values by transmitting resource values to requesting apparatuses through network 118. In at least some embodiments, site databases 119A, 119B, 119C, and 119D are configured to respond to requests to update resource values by receiving resource values from apparatuses or other devices through network 118. In at least some embodiments, site databases 119A, 119B, 119C, and 119D are each an API (Application Programming Interface) server. In at least some embodiments, site databases 119A, 119B, 119C, and 119D are each a stand-alone server or a virtual server instance provided on one or more servers of a cloud computing network.

Figure 2:
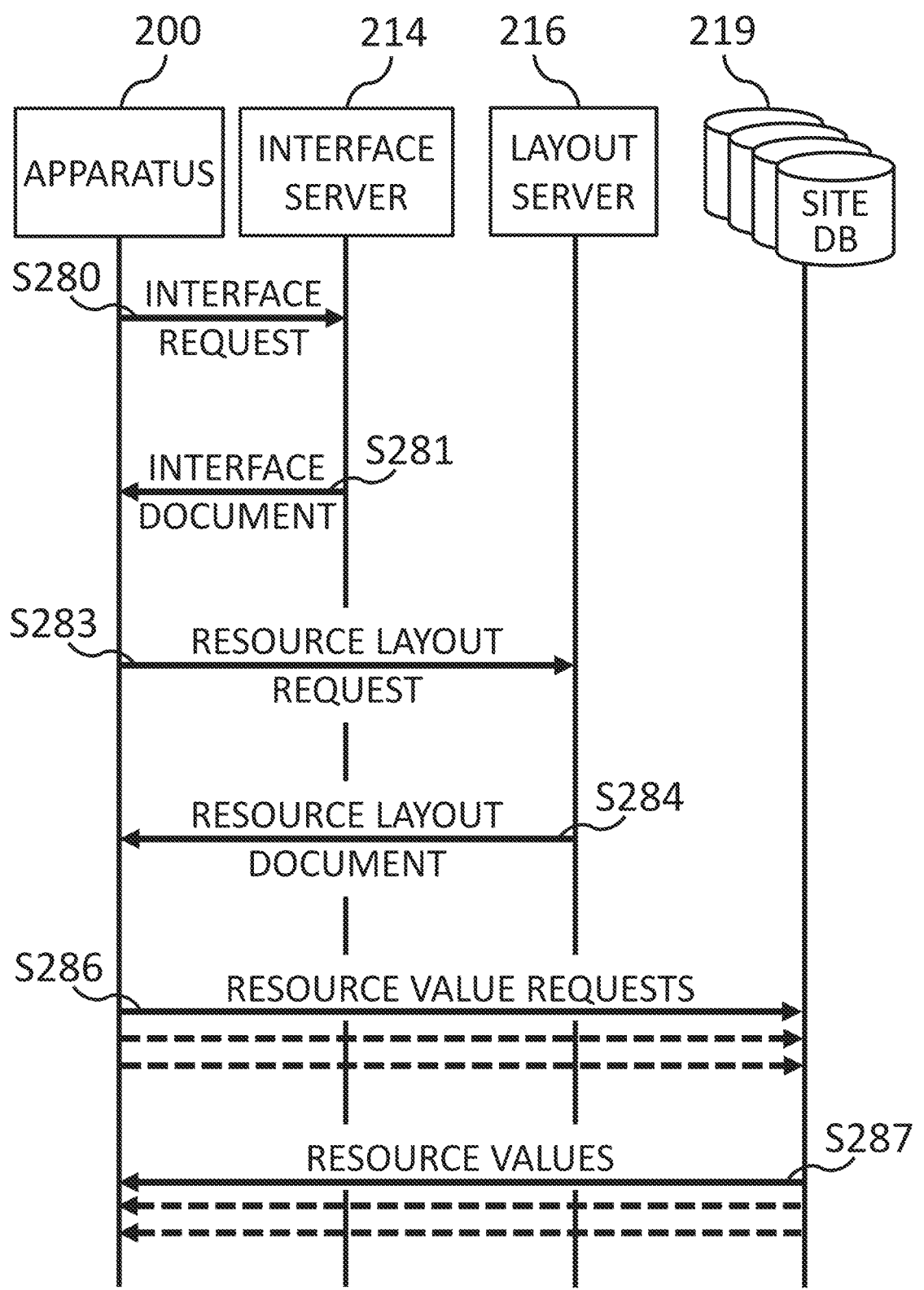
FIG. 2 is a communication flow for embedded resource layout, according to at least some embodiments of the present invention.

FIG. 2 is a communication flow for embedded resource layout, according to at least some embodiments of the present invention. The communication flow is conducted to perform a process of embedded resource layout. In at least some embodiments, the communication flow is conducted among an apparatus 200, an interface server 214, a layout server 216, and a plurality of site databases 219.

At S280, apparatus 200 transmits a request for a graphical interface from interface server 214. In at least some embodiments, apparatus 200 provides a browser application for enabling a user to cause apparatus 200 to transmit requests through an input device. In at least some embodiments, apparatus 200 transmits the request through HTTP. In at least some embodiments, apparatus 200 receives input signals from the input device for requesting the graphical interface. In at least some embodiments, the input signals include a network address of an interface document including appearance specifications for the graphical interface. In at least some embodiments, apparatus 200 transmits the request along with a role identifier.

At S281, interface server 214 transmits the requested interface document to apparatus 200. In at least some embodiments, interface server 214 transmits the interface document through HTTP. In at least some embodiments, interface server 214 transmits one interface document among a plurality of interface documents corresponding to the role identifier.

At S283, apparatus 200 transmits a request for a resource layout from layout server 216. In at least some embodiments, the browser application causes apparatus 200 to transmit the request during rendering of the interface document. In at least some embodiments, apparatus 200 transmits the request through an API. In at least some embodiments, the interface document includes an instruction to request the resource layout. In at least some embodiments, the instruction includes a network address of a resource layout document. In at least some embodiments, apparatus 200 transmits the request along with a user identifier.

At S284, layout server 216 transmits the requested layout document to apparatus 200. In at least some embodiments, layout server 216 transmits the layout document through the API. In at least some embodiments, layout server 216 transmits one layout document among a plurality of layout documents corresponding to the user identifier. In at least some embodiments, layout server 216 verifies one or more credentials associated with the user identifier, such as a password or biometric, before transmitting the layout document.

At S286, apparatus 200 transmits a plurality of requests for resource values from the plurality of site databases 219. In at least some embodiments, the browser application causes apparatus 200 to transmit the requests during rendering of the interface document in response to receiving the resource layout document. In at least some embodiments, the resource layout document includes a plurality of resource references, each resource reference including an instruction to retrieve the associated resource value from a site database among the plurality of site databases 219. In at least some embodiments, apparatus 200 transmits each request through an API of the corresponding site database. In at least some embodiments, each instruction includes a network address of the corresponding site database among site databases 219. In at least some embodiments, apparatus 200 transmits the request along with a user identifier. In at least some embodiments, apparatus 200 includes requests for associated information, such as a resource value constraint, in the same or separate transmissions. In at least some embodiments, apparatus 200 transmits more than one request to the same site database.

At S287, each site database among site databases 219 transmits the requested resource value to apparatus 200. In at least some embodiments, each site database among site databases 219 transmits the resource value through the API. In at least some embodiments, each site database among site databases 219 verifies whether the user identifier has permission to access the corresponding resource value before the transmission. In at least some embodiments, each site database among site databases 219 transmits associated information, such as a resource value constraint.

Figure 3:
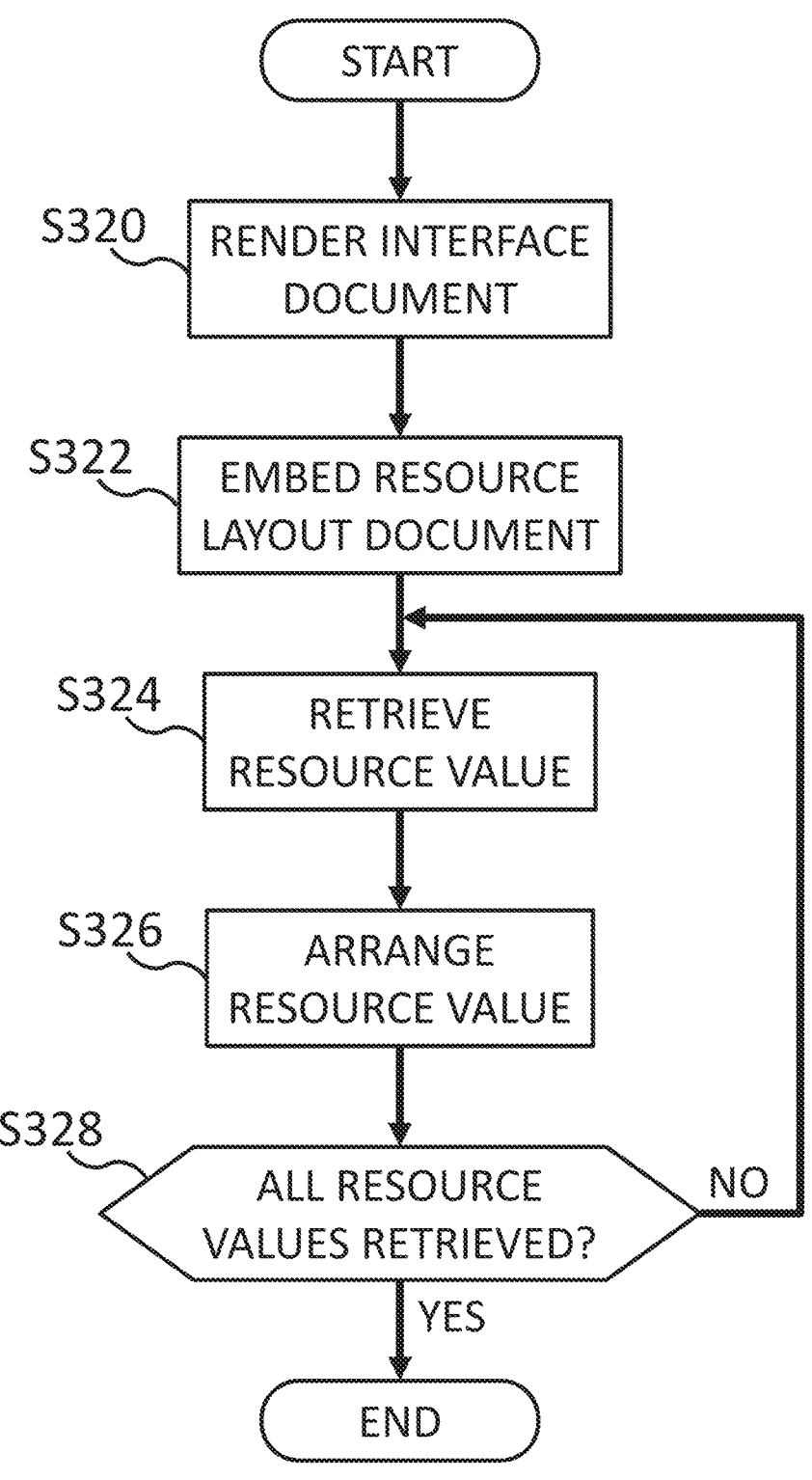
FIG. 3 is an operational flow for embedded resource layout, according to at least some embodiments of the present invention.

FIG. 3 is an operational flow for embedded resource layout, according to at least some embodiments of the present invention. The operational flow provides a method of embedded resource layout. In at least some embodiments, one or more operations of the method are executed by a controller of an apparatus including sections for performing certain operations, such as the controller and apparatus shown in FIG. 9, which will be explained hereinafter.

At S320, a rendering section of the controller renders an interface document. In at least some embodiments, the rendering section renders an interface document to cause a graphical interface to be displayed in accordance with appearance specifications for the graphical interface in the interface document. In at least some embodiments, the rendering section renders the interface document through a browser application on the apparatus. In at least some embodiments, the rendering section generates output signals to a display in communication with the apparatus in accordance with the appearance specifications in the interface document. In at least some embodiments, the rendering section accesses other documents and performs rendering in accordance with appearance specifications or other information within the other documents. In at least some embodiments, the interface document includes references to other specific documents including appearance specifications or information for completing an appearance specification in the interface document.

At S322, an embedding section of the controller embeds a resource layout document into the interface document. In at least some embodiments, the embedding section embeds, into the interface document in response to rendering the interface document, a resource layout document corresponding to a reference in the interface document and a user identity. In at least some embodiments, the embedding section causes the rendering section to render the content of the resource layout document as if the resource layout document were a part of the interface document without modifying the content of the retrieved interface document. In at least some embodiments, the embedding section embeds the resource layout document in response to the rendering section beginning the operation of rendering the interface document.

At S324, a retrieving section of the controller retrieves a resource value. In at least some embodiments, as iterations of the operations of S324 and S326 proceed, the retrieving section retrieves, through a network in response to embedding the resource layout document, a plurality of resource values, each resource value among the plurality of resource values corresponding to a resource reference in the resource layout document. In at least some embodiments, the retrieving section retrieves the resource value from a site database. In at least some embodiments, the retrieving section retrieves the resource value through an API of the site database. In at least some embodiments, the retrieving the plurality of resource values includes transmitting the API call corresponding to each resource reference in the resource layout document. In at least some embodiments, the retrieving section provides a user identifier during retrieval. In at least some embodiments, the retrieving section retrieves associated information, such as a resource value constraint of the resource value. In at least some embodiments, the retrieving section retrieves, in response to embedding the resource layout document, a plurality of resource value constraints, each resource value constraint among the plurality of resource value constraints corresponding to a resource reference in the resource layout document.

At S326, an arranging section of the controller arranges the resource value. In at least some embodiments, as iterations of the operations of S324 and S326 proceed, the arranging section arranges the plurality of resource values in the graphical interface in accordance with positioning specifications in the resource layout document. In at least some embodiments, the arranging section positions the resource value according to absolute coordinates of the display or according to relative coordinates of a window within the browser. In at least some embodiments, the arranging section causes the rendering section to generate output signals in accordance with the positioning specifications in the resource layout document.

At S328, the controller or a section thereof determines whether all resource values have been retrieved. In at least some embodiments, the controller determines whether a resource value has been retrieved for each resource reference in the resource layout document. If the controller determines that resource values remain to be retrieved, then the operational flow returns to resource value retrieval at S324. If the controller determines that all resource values have been retrieved, then the operational flow ends.

Figure 4:
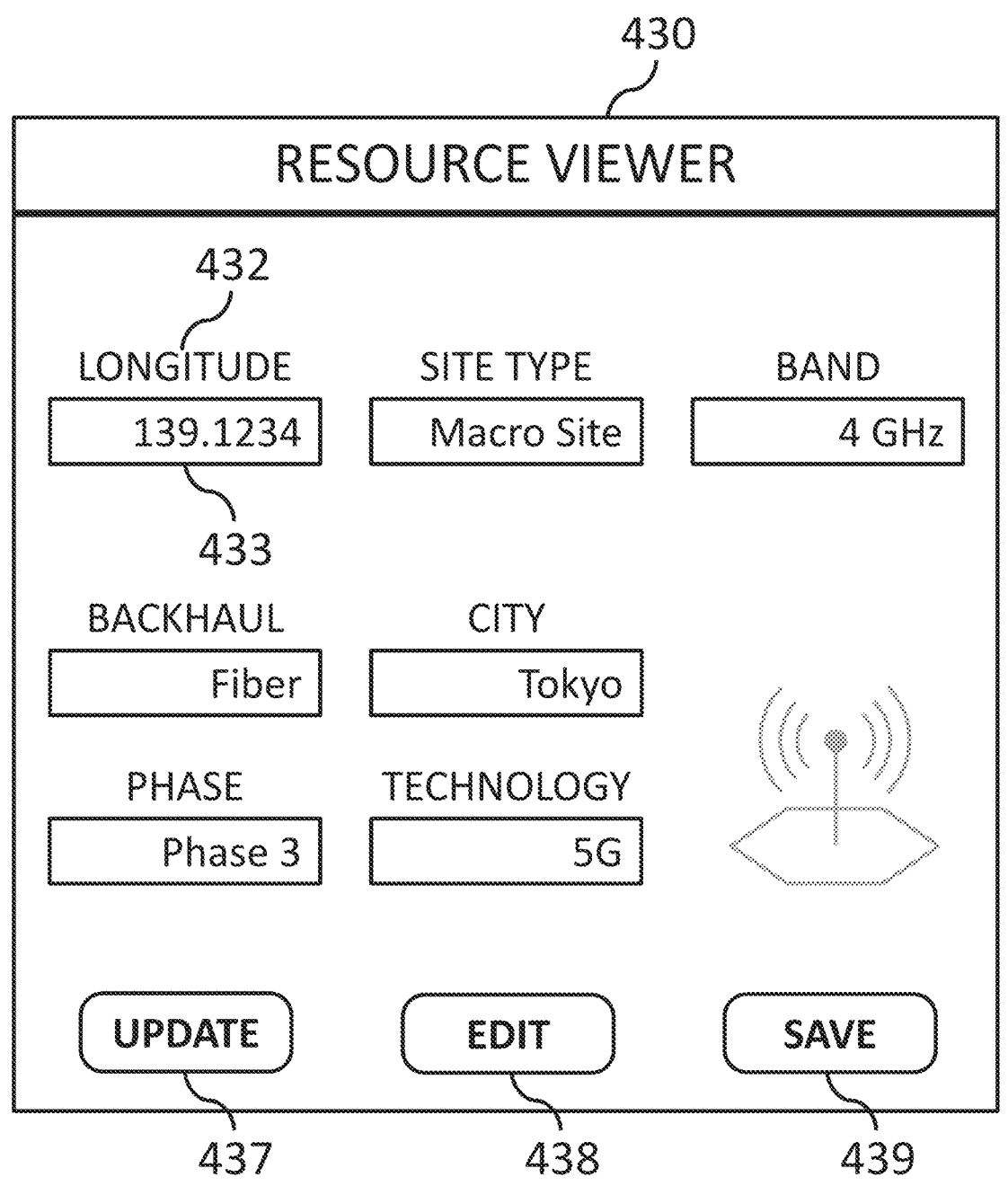
FIG. 4 is a graphical interface with embedded resource layout, according to at least some embodiments of the present invention.

FIG. 4 is a graphical interface 430 with embedded resource layout, according to at least some embodiments of the present invention. In at least some embodiments, graphical interface 430 is presented by a display of an apparatus, such as display 110 of FIG. 1. In at least some embodiments, graphical interface 430 is configured to interact with user input from an input device of the apparatus, such as input device 112 of FIG. 1. Graphical interface 430 includes a plurality of resource name fields, such as resource name field 432, a plurality of corresponding resource value fields, such as resource value field 433, an update activation field 437, an edit activation field 438, and a save activation field 439. In at least some embodiments, graphical interface 430 includes more or less fields than illustrated in FIG. 4, and arrangement of the fields in graphical interface 430 varies from the arrangement illustrated in FIG. 4. In at least some embodiments, the plurality of resource name fields, the plurality of corresponding resource value fields, update activation field 437, edit activation field 438, and save activation field 439 are presented across multiple graphical user interfaces, such as tabs, windows, or other partitions.

Resource name field 432 presents a resource name. In at least some embodiments, resource name field 432 presents a name associated with a resource reference in the resource layout document. In at least some embodiments, resource name field 432 is a string of data included in the resource layout document. In at least some embodiments, resource name field 432 is a string of data retrieved from a site database along with the corresponding resource value. Resource name field 432 shows "LONGITUDE".

Resource value field 433 presents the resource value. In at least some embodiments, resource value field 433 presents the resource value associated with a resource reference in the resource layout document. In at least some embodiments, resource value field 433 is a string, integer, etc. of data retrieved from a site database. Resource value field 433 shows "139.1234". Together with corresponding resource name field 432, graphical interface 430 shows that the longitude is 139.1234. In at least some embodiments, resource value field 433 is an editable field. In at least some embodiments, resource value field 433 presents modified information input from an input device of the apparatus instead of the retrieved values upon receiving input from the input device. In at least some embodiments, resource value field 433 is freely modifiable. In at least some embodiments, resource value field 433 presents a dropdown menu revealing a plurality of predetermine resource values for selection by an input device. In at least some embodiments, the plurality of predetermine resource values are in accordance with corresponding resource value constraints.

Update activation field 437 is an area of graphical interface 430 that performs an action upon interaction therewith. In at least some embodiments, update activation field 437 is presented in a form of a button, a checkbox, or in any other suitable form allowing the user to activate with an input device to cause the apparatus to perform the action. In at least some embodiments, update activation field 437 is configured to cause the apparatus to push one or more resource values presented in graphical interface 430 to corresponding site databases. In at least some embodiments, update activation field 437 is configured to cause the apparatus to perform the operation flow described hereinafter with respect to FIG. 5.

Edit activation field 438 is an area of graphical interface 430 that performs an action upon interaction therewith. In at least some embodiments, edit activation field 438 is presented in a form of a button, a checkbox, or in any other suitable form allowing the user to activate with an input device to cause the apparatus to perform the action. In at least some embodiments, edit activation field 438 is configured to cause the apparatus to present options for modifying graphical interface 430 in graphical interface 430. In at least some embodiments, edit activation field 438 is configured to cause the apparatus to perform the operation at S750 described hereinafter with respect to FIG. 7.

Save activation field 439 is an area of graphical interface 430 that performs an action upon interaction therewith. In at least some embodiments, save activation field 439 is presented in a form of a button, a checkbox, or in any other suitable form allowing the user to activate with an input device to cause the apparatus to perform the action. In at least some embodiments, save activation field 439 is configured to cause the apparatus to record modifications of graphical interface 430. In at least some embodiments, save activation field 439 is configured to cause the apparatus to modify the resource layout document in accordance with the modifications of graphical interface 430. In at least some embodiments, save activation field 439 is configured to cause the apparatus to perform the operation flow described hereinafter with respect to FIG. 7.

In at least some embodiments, the graphical interface is any type of interface, such as a form, chart, table, etc., that enables a user to view and update resource values, and to modify the layout thereof. In at least some embodiments, the graphical interface includes additional fields, such as a resource description field corresponding to each resource name field, etc.

Figure 5:
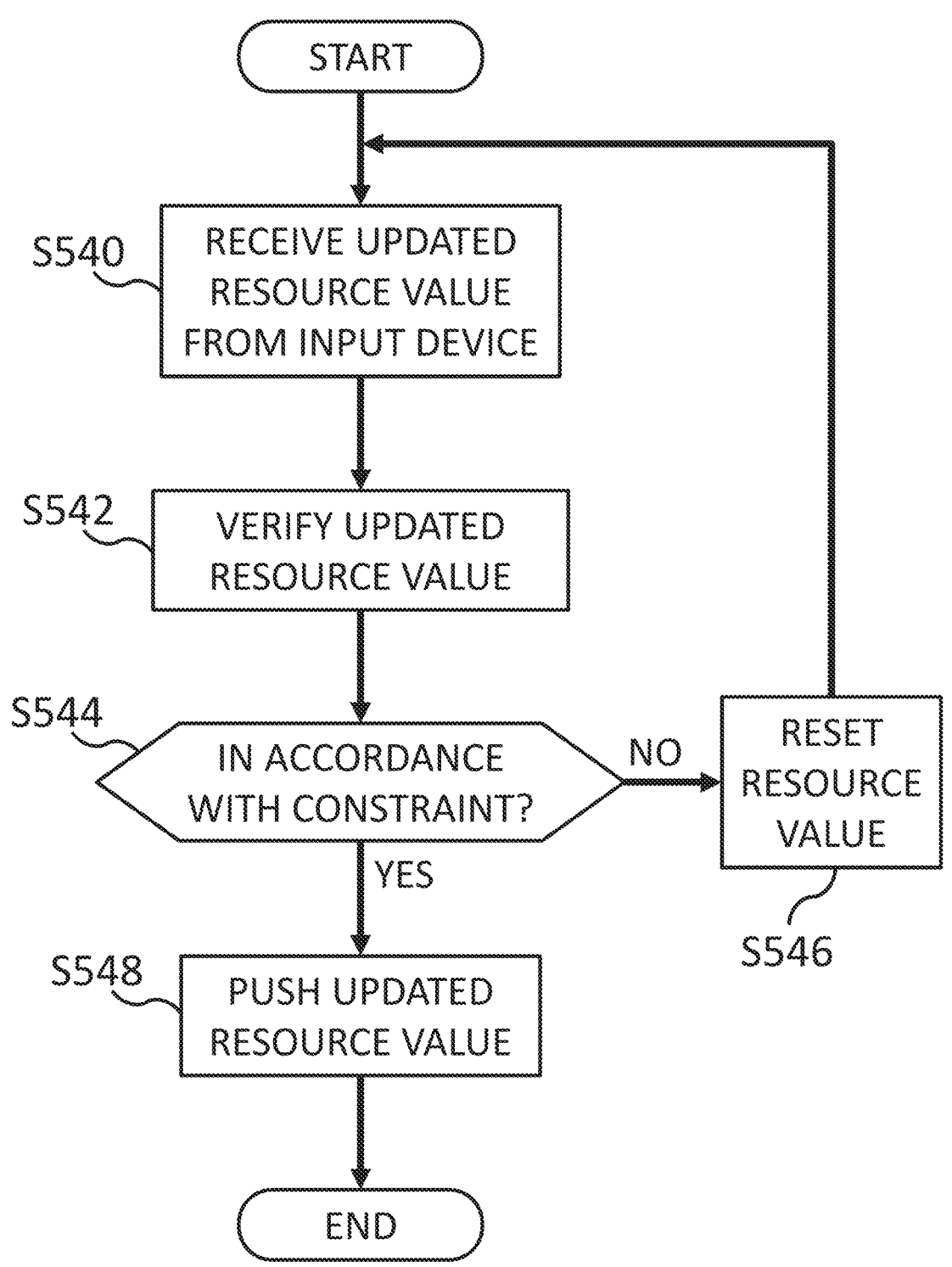
FIG. 5 is an operational flow for resource value updating, according to at least some embodiments of the present invention.

FIG. 5 is an operational flow for resource value updating, according to at least some embodiments of the present invention. The operational flow provides a method of resource value updating. In at least some embodiments, one or more operations of the method are executed by a retrieving section of an apparatus including sections for performing certain operations, such as the controller and apparatus shown in FIG. 9, which will be explained hereinafter. In at least some embodiments, the operational flow is initiated upon activation of an update activation field, such as update activation field 437 of FIG. 4.

At S540, the retrieving section or a sub-section thereof receives an updated resource value from an input device of the apparatus. In at least some embodiments, the retrieving section receives, from an input device, an updated resource value corresponding to a resource reference in the resource layout document. In at least some embodiments, the retrieving section reads the values currently entered in the resource value fields of a graphical interface. In at least some embodiments, the retrieving section only reads values that have been changed from the retrieved value. In at least some embodiments, more than one changed value exists upon activation of the updated activation field, and the operational flow is performed for each changed value.

At S542, the retrieving section or a sub-section thereof verifies the updated resource value. In at least some embodiments, the retrieving section verifies, in response to receiving the updated resource value, that the updated resource value is in accordance with the corresponding resource value constraint. In at least some embodiments, the retrieving section checks whether the resource value does not include any letters or symbols in response to the corresponding resource value constraint specifying that the resource value must be an integer. In at least some embodiments, the retrieving section checks whether the resource value matches a predetermined value in response to the corresponding resource value constraint specifying that the resource value must be one of a plurality of predetermined values.

At S544, the retrieving section determines whether the updated resource value is in accordance with any corresponding resource value constraints. If the retrieving section determines that the updated resource value is not in accordance with a corresponding resource value constraint, then the operational flow proceeds to resource value resetting at S546 before returning to updated resource value reception at S540. In at least some embodiments, the retrieving section presents a reason for resetting at S546, such as "INTEGER REQUIRED". If the retrieving section determines that the updated resource value is in accordance with a corresponding resource value constraint, then the operational flow proceeds to updated resource value pushing at S548.

At S548, the retrieving section or a sub-section thereof pushes the updated resource value to the corresponding site database. In at least some embodiments, the retrieving section pushes, through the network, the updated resource value to a corresponding site database. In at least some embodiments, the retrieving section transmits the updated resource value through an API of the corresponding site database. In at least some embodiments, the retrieving section provides a user identifier during pushing.

Figure 6:
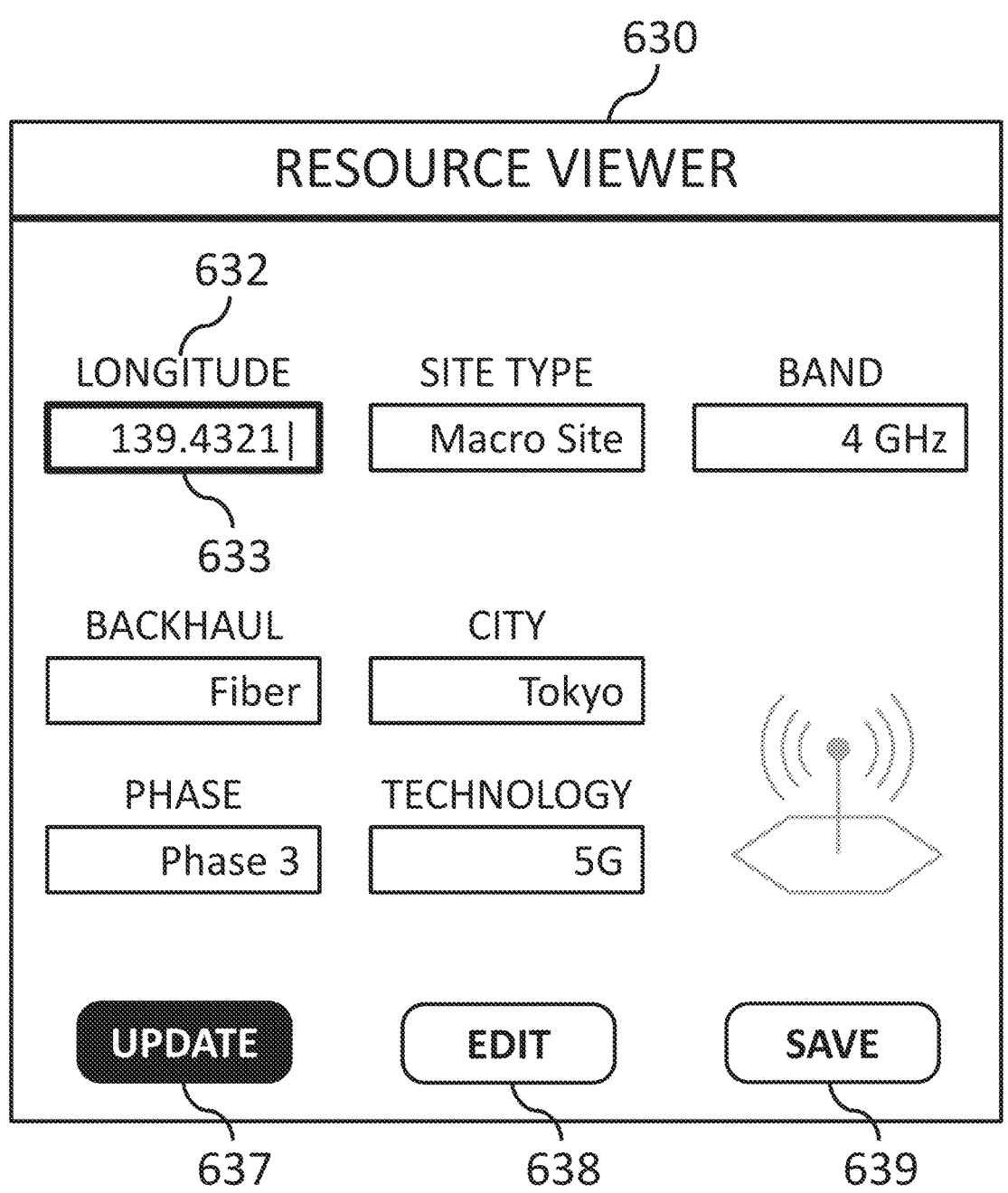
FIG. 6 is a graphical interface during resource value updating, according to at least some embodiments of the present invention.

FIG. 6 is a graphical interface 630 during resource value updating, according to at least some embodiments of the present invention. In at least some embodiments, graphical interface 630 is presented by a display of an apparatus, such as display 110 of FIG. 1. In at least some embodiments, graphical interface 630 is configured to interact with user input from an input device of the apparatus, such as input device 112 of FIG. 1. Graphical interface 630 includes a plurality of resource name fields, such as resource name field 632, a plurality of corresponding resource value fields, such as resource value field 633, an update activation field 637, an edit activation field 638, and a save activation field 639. In at least some embodiments, graphical interface 630 includes more or less fields than illustrated in FIG. 4, and arrangement of the fields in graphical interface 630 varies from the arrangement illustrated in FIG. 4. In at least some embodiments, the plurality of resource name fields, the plurality of corresponding resource value fields, update activation field 637, edit activation field 638, and save activation field 639 are presented across multiple graphical user interfaces, such as tabs, windows, or other partitions.

The plurality of resource name fields, the plurality of corresponding resource value fields, update activation field 637, edit activation field 638, and save activation field 639 are substantially similar in structure and function to the plurality of resource name fields, the plurality of corresponding resource value fields, update activation field 437, edit activation field 438, and save activation field 439 of FIG. 4, respectively, except as expressly distinguished.

Resource value field 633 has been modified from the value shown in FIG. 4, and instead shows "139.4321". In at least some embodiments, resource value field 633 presents the modified value in response to input from an input device of the apparatus.

Update activation field 637 has been activated by the input device to cause the apparatus to push the current resource values presented in graphical interface 630 of "139.4321" to the corresponding site database.

Figure 7:
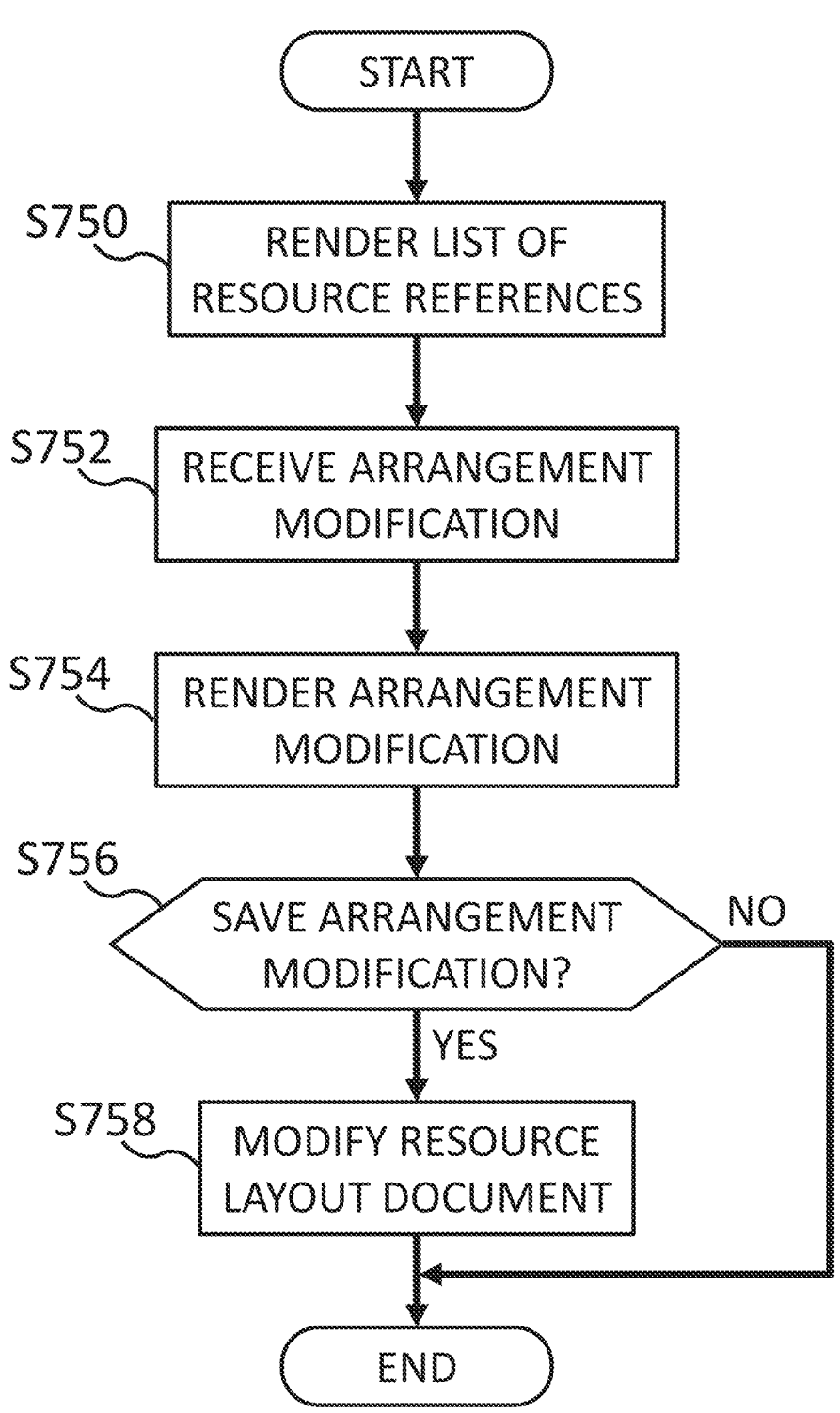
FIG. 7 is an operational flow for resource layout modification, according to at least some embodiments of the present invention.

FIG. 7 is an operational flow for resource layout modification, according to at least some embodiments of the present invention. The operational flow provides a method of resource layout modification. In at least some embodiments, one or more operations of the method are executed by an arranging section of an apparatus including sections for performing certain operations, such as the controller and apparatus shown in FIG. 9, which will be explained hereinafter.

At S750, the arranging section or a sub-section thereof renders a list of resource references. In at least some embodiments, the arranging section renders the interface document to cause a list of resource references to be displayed in the graphical interface. In at least some embodiments, the arranging section causes the rendering section to display a resource name associated with each of a plurality of resource references included in the interface document. In at least some embodiments, the resource references included in the resource layout document are a subset of the plurality of resource references included in the interface document. In at least some embodiments, the arranging section causes the rendering section to display a resource name for each resource reference. In at least some embodiments, the arranging section cause the rendering section to display only resource references that do not correspond to resource values already being displayed in the graphic interface. In at least some embodiments, the arranging section renders the list of resource references in response to activation of an edit activation field, such as edit activation field 638 of FIG. 6.

At S752, the arranging section or a sub-section thereof receives an arrangement modification. In at least some embodiments, the arranging section receives, from an input device, an instruction to modify the arrangement of the graphical interface by modifying a position of a resource value. In at least some embodiments, the arranging section receives, from an input device, an instruction to modify the arrangement of the graphical interface by at least one of removing a resource value or adding a resource value corresponding to a resource reference from the list of resource references. In at least some embodiments, the arrangement modification is a removal of a resource value from the graphical interface. In at least some embodiments, the arrangement modification is an addition of a resource value from the list of resource references to the graphical interface. In at least some embodiments, the graphical interface is configured to allow an input device to cause a drag-and-drop of a resource value in the list of resource references to an area of the graphical interface outside of the list of resource references to add the resource value. In at least some embodiments, the graphical interface is configured to allow an input device to cause a drag-and-drop of a resource value in an area outside of the list of resource references to the list of resource references to remove the resource value.

At S754, the arranging section or a sub-section thereof renders the arrangement modification. In at least some embodiments, the arranging section causes the rendering section to render, in response to receiving the instruction from the input device, the arrangement modification of the graphical interface by modifying the position of the resource value. In at least some embodiments, the arranging section causes the rendering section to render, in response to receiving the instruction from the input device, the arrangement modification of the graphical interface by the at least one of removing the resource value or adding the resource value corresponding to the resource reference from the list of resource references. In at least some embodiments, the arranging section causes the rendering section to render the interface document as if the modification was part of the resource layout document.

At S756, the arranging section determines whether to save the arrangement modification. In at least some embodiments, the arranging section awaits activation of a save activation field of the graphical interface, such as save activation field 639 of FIG. 6. In at least some embodiments, the arranging section detects activation of the save activation field in response to activation by the input device. If the arranging section determines to save the arrangement modification, then the operational flow proceeds to resource layout document modification at S758. If the arranging section determines not to save the arrangement modification, then the operational flow ends.

At S758, the arranging section or a sub-section thereof modifies the resource layout document. In at least some embodiments, the arranging section modifies the resource layout document by modifying the positioning specification corresponding to the resource reference that corresponds to the resource value of the modified position. In at least some embodiments, the arranging section modifies the resource layout document by at least one of removing a resource reference or adding a resource reference from the list of resource references. In at least some embodiments, the arranging section overwrites the resource layout document, and causes the embedding section to push the modified resource layout document to a layout server, such as layout server 116 of FIG. 1.

Figure 8:
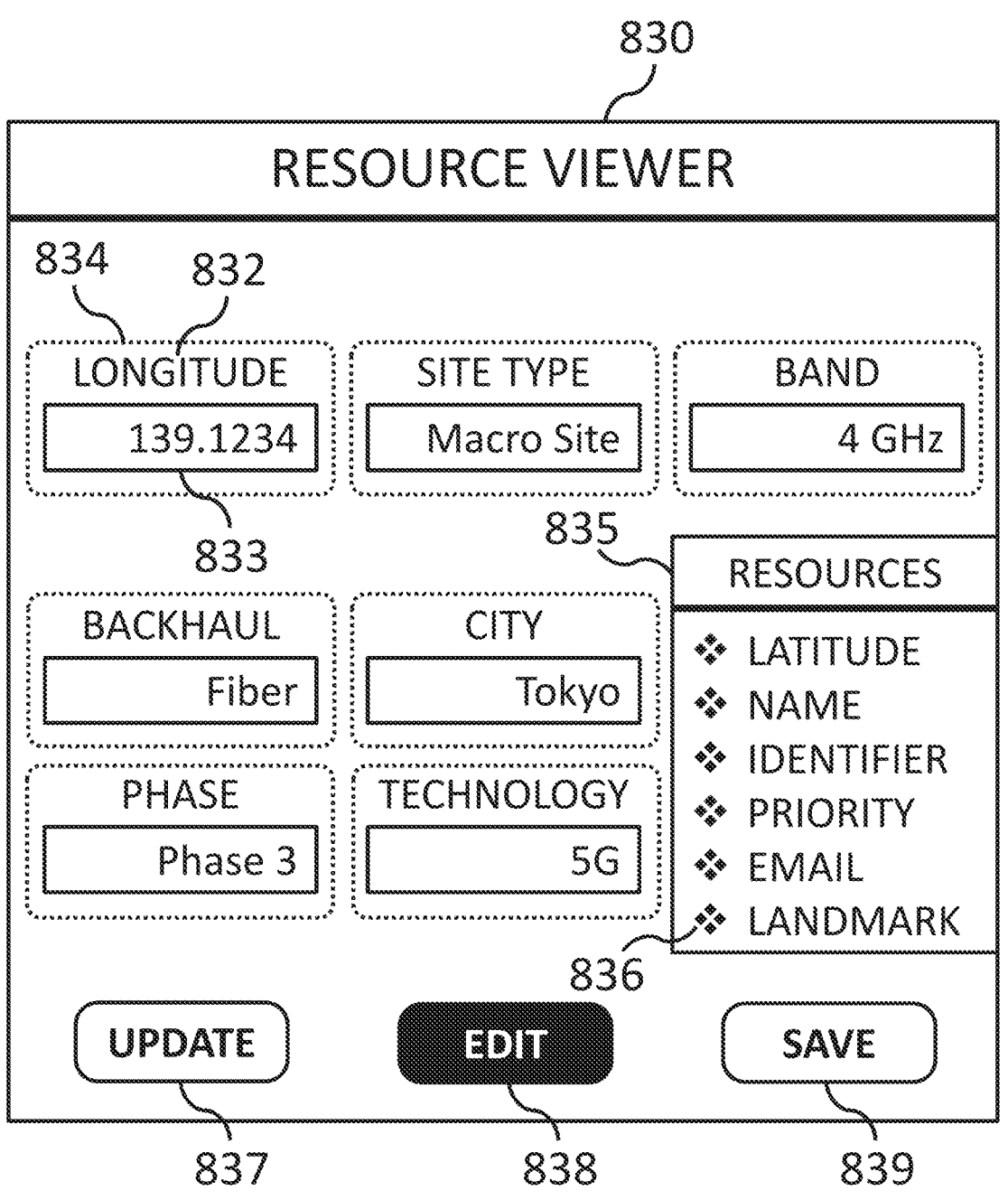
FIG. 8 is a graphical interface during resource layout modification, according to at least some embodiments of the present invention.

FIG. 8 is a graphical interface 830 during resource layout modification, according to at least some embodiments of the present invention. In at least some embodiments, graphical interface 830 is presented by a display of an apparatus, such as display 110 of FIG. 1. In at least some embodiments, graphical interface 830 is configured to interact with user input from an input device of the apparatus, such as input device 112 of FIG. 1. Graphical interface 830 includes a plurality of resource name fields, such as resource name field 832, a plurality of corresponding resource value fields, such as resource value field 833, a plurality of location anchors, such as location anchor 834, a resource reference list 835 including a plurality of resource references, such as resource reference 836, an update activation field 837, an edit activation field 838, and a save activation field 839. In at least some embodiments, graphical interface 830 includes more or less fields than illustrated in FIG. 4, and arrangement of the fields in graphical interface 830 varies from the arrangement illustrated in FIG. 4. In at least some embodiments, the plurality of resource name fields, the plurality of corresponding resource value fields, the plurality of location anchors, resource reference list 835, update activation field 837, edit activation field 838, and save activation field 839 are presented across multiple graphical user interfaces, such as tabs, windows, or other partitions.

The plurality of resource name fields, the plurality of corresponding resource value fields, update activation field 837, edit activation field 838, and save activation field 839 are substantially similar in structure and function to the plurality of resource name fields, the plurality of corresponding resource value fields, update activation field 437, edit activation field 438, and save activation field 439 of FIG. 4, respectively, except as expressly distinguished.

Location anchor 834 is a visual indicator of a position of a resource value. In at least some embodiments, the plurality of location anchors are present regardless of whether a resource value occupies the position. In at least some embodiments, a location anchor holds only one resource value. In at least some embodiments, a location anchor indicates the area within which a resource value may be dragged from graphical interface 830.

Resource reference list 835 presents a listing of resource names, such as resource reference 836. In at least some embodiments, resource reference list 835 presents a name associated with each resource reference in the interface document. In at least some embodiments, resource reference list 835 is an input field in which a resource name is directly specified in response to input from an input device. In at least some embodiments, resource reference list 835 includes a search field to enable searching for a target resource reference. In at least some embodiments, the search field is a search bar, wherein in response to input of "resource type", "resource provider", "resource location", a keyword, or any other information associated with the information of the target resource reference, resource reference list 835 is updated to show only resource references partially or fully matching the input.

Edit activation field 838 has been activated by the input device to cause the rendering section to display list of resources 835 and allow modification of the layout of resource values in graphic interface 830.

Figure 9:
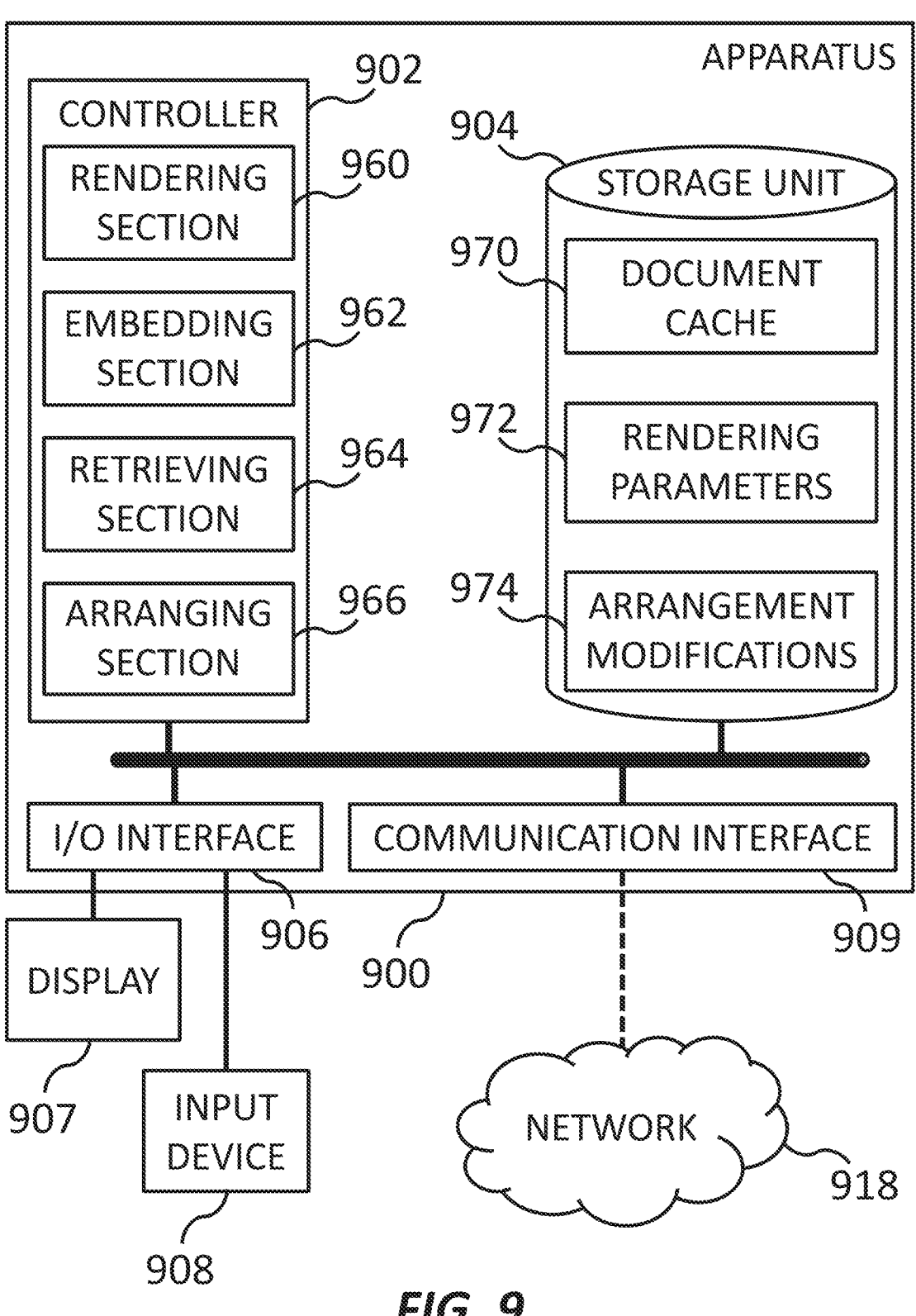
FIG. 9 is a block diagram of a hardware configuration for embedded resource layout, according to at least some embodiments of the present invention.

FIG. 9 is a block diagram of a hardware configuration for embedded resource layout, according to at least some embodiments of the present invention.

The exemplary hardware configuration includes apparatus 900, which interacts with display 907 and input device 908, and communicates with network 918. In at least some embodiments, apparatus 900 is a computer or other computing device that receives input or commands from input device 908. In at least some embodiments, apparatus 900 is integrated with input device 908. In at least some embodiments, apparatus 900 is a computer system that executes computer-readable instructions to perform operations for embedded resource layout.

Apparatus 900 includes a controller 902, a storage unit 904, an input/output interface 906, and a communication interface 909. In at least some embodiments, controller 902 includes a processor or programmable circuitry executing instructions to cause the processor or programmable circuitry to perform operations according to the instructions. In at least some embodiments, controller 902 includes analog or digital programmable circuitry, or any combination thereof. In at least some embodiments, controller 902 includes physically separated storage or circuitry that interacts through communication. In at least some embodiments, storage unit 904 includes a non-volatile computer-readable medium capable of storing executable and non-executable data for access by controller 902 during execution of the instructions. Communication interface 909 transmits and receives data from network 918. Input/output interface 906 connects to various input and output units, such as input device 908, via a parallel port, a serial port, a keyboard port, a mouse port, a monitor port, and the like to accept commands and present information. In some embodiments, storage unit 904 is external from apparatus 900.

Controller 902 includes rendering section 960, embedding section 962, retrieving section 964, and arranging section 966. Storage unit 904 includes document cache 970, rendering parameters 972, and arrangement modifications 974.

Rendering section 960 is the circuitry or instructions of controller 902 configured to render interface documents and associated information. In at least some embodiments, rendering section 960 is configured to render an interface document to cause a graphical interface to be displayed in accordance with appearance specifications for the graphical interface in the interface document. In at least some embodiments, rendering section 960 utilizes information in storage unit 904, such as document cache 970 and rendering parameters 972. In at least some embodiments, rendering section 960 includes sub-sections for performing additional functions, as described in the foregoing flow charts. In at least some embodiments, such sub-sections is referred to by a name associated with a corresponding function.

Embedding section 962 is the circuitry or instructions of controller 902 configured to embed documents for rendering. In at least some embodiments, embedding section 962 is configured to embed, into the interface document in response to rendering the interface document, a resource layout document corresponding to a reference in the interface document and a user identity. In at least some embodiments, embedding section 962 utilizes information in storage unit 904, such as document cache 970. In at least some embodiments, embedding section 962 includes sub-sections for performing additional functions, as described in the foregoing flow charts. In at least some embodiments, such sub-sections is referred to by a name associated with a corresponding function.

Retrieving section 964 is the circuitry or instructions of controller 902 configured to retrieve resource values and associated information. In at least some embodiments, retrieving section 964 is configured to retrieve, through a network in response to embedding the resource layout document, a plurality of resource values, each resource value among the plurality of resource values corresponding to a resource reference in the resource layout document. In at least some embodiments, retrieving section 964 utilizes information from storage unit 904, such as document cache 970. In at least some embodiments, retrieving section 964 includes sub-sections for performing additional functions, as described in the foregoing flow charts. In at least some embodiments, such sub-sections is referred to by a name associated with a corresponding function.

Arranging section 966 is the circuitry or instructions of controller 902 configured to arrange resource values. In at least some embodiments, arranging section 966 is configured to arrange the plurality of resource values in the graphical interface in accordance with positioning specifications in the resource layout document. In at least some embodiments, arranging section 966 utilizes information from storage unit 904, document cache 970, and records information to storage unit 904, such as arrangement modifications 974. In at least some embodiments, retrieving section 964 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, embedded resource layouts are presented by rendering an interface document to cause a graphical interface to be displayed in accordance with appearance specifications for the graphical interface in the interface document, embedding, into the interface document in response to rendering the interface document, a resource layout document corresponding to a reference in the interface document and a user identity, retrieving, through a network in response to embedding the resource layout document, a plurality of resource values, each resource value among the plurality of resource values corresponding to a resource reference in the resource layout document, and arranging the plurality of resource values in the graphical interface in accordance with positioning specifications in the resource layout document.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable medium including instructions executable by a processor to cause the processor to perform operations comprising:

rendering an interface document to cause a graphical interface to be displayed in accordance with appearance specifications for the graphical interface in the interface document;

transmitting, from an apparatus associated with a user in response to rendering the interface document, a resource layout request comprising a user identifier associated with the user requesting the graphical interface;

embedding, into the interface document in response to the resource layout request, a resource layout document associated with the user based on the user identifier, wherein the resource layout document indicates a reference in the interface document, and wherein the resource layout document comprises a plurality of resource references and a positioning specification associated with each of the plurality of resource references;

retrieving, through a network in response to embedding the resource layout document, a plurality of resource values based on the user identifier, wherein each resource value among the plurality of resource values corresponds to a resource reference among the plurality of resource references included in the resource layout document;

arranging the plurality of resource values in the graphical interface in accordance with the positioning specification associated with corresponding resource reference of the plurality of resource references;

in response to arranging of the plurality of resource values, receiving an input associated with at least one of the plurality of resource values or the plurality of resource references;

modifying the resource layout document associated with the user based on the input to generate a modified resource layout document;

embedding the modified resource layout document into the interface document; and rendering an updated graphical interface in response to the embedding of the modified resource layout document into the interface document.

2. The computer-readable medium of claim 1, wherein the operations further comprise:

receiving, from an input device, an updated resource value corresponding to a resource reference in the resource layout document; and pushing, through the network, the updated resource value to a corresponding site database.

3. The computer-readable medium of claim 1, wherein the operations further comprise:

retrieving, in response to embedding the resource layout document, a plurality of resource value constraints, each resource value constraint among the plurality of resource value constraints corresponding to a resource reference in the resource layout document; and verifying, in response to receiving the updated resource value, that the updated resource value is in accordance with the corresponding resource value constraint.

4. The computer-readable medium of claim 1, wherein the operations further comprise:

rendering the interface document to cause a list of resource references to be displayed in the graphical interface;

receiving, from an input device, an instruction to modify the arrangement of the graphical interface by at least one of removing a resource value or adding a resource value corresponding to a resource reference from the list of resource references; and rendering, in response to receiving the instruction from the input device, the arrangement modification of the graphical interface by the at least one of removing the resource value or adding the resource value corresponding to the resource reference from the list of resource references.

5. The computer-readable medium of claim 4, wherein the operations further comprise:

modifying the resource layout document by at least one of removing a resource reference or adding a resource reference from the list of resource references.

6. The computer-readable medium of claim 1, wherein the operations further comprise:

receiving, from an input device, an instruction to modify the arrangement of the graphical interface by modifying a position of a resource value; and rendering, in response to receiving the instruction from the input device, the arrangement modification of the graphical interface by modifying the position of the resource value.

7. The computer-readable medium of claim 6, wherein the operations further comprise:

modifying the resource layout document by modifying the positioning specification corresponding to the resource reference that corresponds to the resource value of the modified position.

8. The computer-readable medium of claim 1, wherein the interface document includes, for each resource reference among the plurality of resource references, a string representing an API call for retrieving the corresponding resource value, and the operation of retrieving the plurality of resource values includes transmitting the API call corresponding to each resource reference in the resource layout document.

9. A method comprising:

rendering an interface document to cause a graphical interface to be displayed in accordance with appearance specifications for the graphical interface in the interface document;

transmitting, from an apparatus associated with a user in response to rendering the interface document, a resource layout request comprising a user identifier associated with the user requesting the graphical interface;

embedding, into the interface document in response to the resource layout request, a resource layout document associated with the user based on the user identifier, wherein the resource layout document indicates a reference in the interface document, and wherein the resource layout document comprises a plurality of resource references and a positioning specification associated with each of the plurality of resource references;

retrieving, through a network in response to embedding the resource layout document, a plurality of resource values based on the user identifier, wherein each resource value among the plurality of resource values corresponds to a resource reference among the plurality of resource references included in the resource layout document;

arranging the plurality of resource values in the graphical interface in accordance with the positioning specification associated with corresponding resource reference of the plurality of resource references;

in response to arranging of the plurality of resource values, receiving an input associated with at least one of the plurality of resource values or the plurality of resource references;

modifying the resource layout document associated with the user based on the input to generate a modified resource layout document;

embedding the modified resource layout document into the interface document; and rendering an updated graphical interface in response to the embedding of the modified resource layout document into the interface document.

10. The method of claim 9, further comprising:

receiving, from an input device, an updated resource value corresponding to a resource reference in the resource layout document; and pushing, through the network, the updated resource value to a corresponding site database.

11. The method of claim 9, further comprising:

retrieving, in response to embedding the resource layout document, a plurality of resource value constraints, each resource value constraint among the plurality of resource value constraints corresponding to a resource reference in the resource layout document; and verifying, in response to receiving the updated resource value, that the updated resource value is in accordance with the corresponding resource value constraint.

12. The method of claim 9, further comprising:

rendering the interface document to cause a list of resource references to be displayed in the graphical interface;

receiving, from an input device, an instruction to modify the arrangement of the graphical interface by at least one of removing a resource value or adding a resource value corresponding to a resource reference from the list of resource references; and rendering, in response to receiving the instruction from the input device, the arrangement modification of the graphical interface by the at least one of removing the resource value or adding the resource value corresponding to the resource reference from the list of resource references.

13. The method of claim 12, further comprising:

modifying the resource layout document by at least one of removing a resource reference or adding a resource reference from the list of resource references.

14. The method of claim 9, further comprising:

receiving, from an input device, an instruction to modify the arrangement of the graphical interface by modifying a position of a resource value; and rendering, in response to receiving the instruction from the input device, the arrangement modification of the graphical interface by modifying the position of the resource value.

15. The computer-readable medium of claim 1, wherein each of the plurality of resource references correspond to an API call string.

16. The computer-readable medium of claim 1, wherein the appearance specifications of the interface document remain unchanged for each of a plurality of users.

17. An apparatus comprising:

a controller including circuitry configured to:

rendering an interface document to cause a graphical interface to be displayed in accordance with appearance specifications for the graphical interface in the interface document;

transmitting, from the apparatus associated with a user in response to rendering the interface document, a resource layout request comprising a user identifier associated with the user requesting the graphical interface;

embedding, into the interface document in response to the resource layout request, a resource layout document associated with the user based on the user identifier, wherein the resource layout document indicates a reference in the interface document, and wherein the resource layout document comprises a plurality of resource references and a positioning specification associated with each of the plurality of resource references;

retrieving, through a network in response to embedding the resource layout document, a plurality of resource values based on the user identifier, wherein each resource value among the plurality of resource values corresponds to a resource reference among the plurality of resource references included in the resource layout document;

arranging the plurality of resource values in the graphical interface in accordance with the positioning specification associated with corresponding resource reference of the plurality of resource references;

in response to arranging of the plurality of resource values, receiving an input associated with at least one of the plurality of resource values or the plurality of resource references;

modifying the resource layout document associated with the user based on the input to generate a modified resource layout document;

embedding the modified resource layout document into the interface document; and rendering an updated graphical interface in response to the embedding of the modified resource layout document into the interface document.

18. The apparatus of claim 17, wherein the circuitry is further configured to:

receiving, from an input device, an updated resource value corresponding to a resource reference in the resource layout document, and pushing, through the network, the updated resource value to a corresponding site database.

19. The apparatus of claim 17, wherein the circuitry is further configured to:

retrieving, in response to embedding the resource layout document, a plurality of resource value constraints, each resource value constraint among the plurality of resource value constraints corresponding to a resource reference in the resource layout document, and verifying, in response to receiving the updated resource value, that the updated resource value is in accordance with the corresponding resource value constraint.

20. The apparatus of claim 17, wherein the circuitry is further configured to:

rendering the interface document to cause a list of resource references to be displayed in the graphical interface, receiving, from an input device, an instruction to modify the arrangement of the graphical interface by at least one of removing a resource value or adding a resource value corresponding to a resource reference from the list of resource references, and rendering, in response to receiving the instruction from the input device, the arrangement modification of the graphical interface by the at least one of removing the resource value or adding the resource value corresponding to the resource reference from the list of resource references.

* * * * *